United States Patent [19]

Taka et al.

[11] Patent Number: 5,362,765

[45] Date of Patent: Nov. 8, 1994

[54] POLYESTER FOAMED THIN MATERIALS

[75] Inventors: Toshio Taka; Yuichiro Yasukawa; Tetuya Takahashi; Akira Nakamura; Ryosuke Kamei, all of Kawasaki, Japan; Eiichiro Takiyama, Kamakura, all of Japan

[73] Assignee: Showa Highpolymer Co., Ltd., Tokyo, Japan

[21] Appl. No.: 220,667

[22] Filed: Mar. 31, 1994

Related U.S. Application Data

[62] Division of Ser. No. 49,451, Apr. 20, 1993, Pat. No. 5,321,052.

[30] Foreign Application Priority Data

May 12, 1992 [JP] Japan .................................. 4-119196
May 14, 1992 [JP] Japan .................................. 4-148313

[51] Int. Cl.$^5$ ............................................. C08G 75/00
[52] U.S. Cl. ................................... 521/172; 521/182; 521/159
[58] Field of Search ........................ 521/172, 182, 159

[56] References Cited

U.S. PATENT DOCUMENTS 2,999,851  9/1961  Elmer .................................. 528/83
3,524,825  8/1970  Rill, Jr. ................................ 521/131
4,166,873  9/1979  Gilliam ............................... 428/34.7

FOREIGN PATENT DOCUMENTS 0323700   7/1989  European Pat. Off. .
0393819  10/1990  European Pat. Off. .
0447817   9/1991  European Pat. Off. .
1059075   3/1954  France .
2353531   5/1974  Germany .
3810595  10/1989  Germany .
748872    5/1956  United Kingdom .
2021602  12/1979  United Kingdom .

*Primary Examiner*—Morton Foelak
*Attorney, Agent, or Firm*—Sughrue, Mion, Zinn, Macpeak & Seas

[57] ABSTRACT

Foamed thin materials such as foamed film and foamed fibrillated materials produced by extruding a composition consisting of 100 parts by weight of aliphatic polyester having a melt viscosity of $1.0 \times 10^3 - 1.0 \times 10^5$ poises at a temperature of 190° C. and a shear rate of 100 sec$^{-1}$, and having a melting point of 70°-200° C., and 0.2-5 parts by weight of foaming agent. These foamed thin materials has biodegradability, excellent mechanical, insulating, touch and aesthetic properties. They are useful materials as insulating, packaging, oil absorbing materials and filters.

16 Claims, No Drawings

POLYESTER FOAMED THIN MATERIALS

This is a divisional of application Ser. No. 08/049,451 filed Apr. 20, 1993 U.S. Pat. No. 5,321,052.

BACKGROUND OF THE INVENTION

1. Field of the Invention

The present invention relates to foamed thin materials, especially, films and fibrillated materials having excellent fineness and feel which are prepared by using aliphatic polyesters with biodegradability and sufficiently high molecular weight and specific melt properties for practical use.

2. Discussion of the Background

In recent years, foamed films are used as insulating materials, packaging materials, industrial and agricultural materials. Further, an adsorptive plastic cellular fibrillated material has been used such processes as the separation of oil spills, removal of toxic floats on rivers, removal of nicotine from cigarettes and the like. On the other hand, as it also has a soft feel and aesthetic properties and has been utilized in industrial materials such as mats.

However, there has greatly been a community problem in that the plastic waste resulting from their use can pollute rivers, oceans, soil and the like. To prevent such pollution the development of biodegradable plastics has been desired; for, example, poly(3-hydroxybutylate) produced by fermentation methods using microorganisms, blends of general-purpose plastics and starch, a naturally occurring polymer, and the like are already known. The former polymer has a drawback in that it is poor in molding properties because the polymer has a heat decomposition temperature close to its melting point and a raw material efficiency is very bad because it is produced by microorganisms. On the other hand, since the naturally occurring polymer of the latter does not by itself have thermoplasticity, the polymer has defects in molding properties, and is greatly limited in its range of application.

On the other hand, although it is known that aliphatic polyesters are biodegradable, they have hardly been used because the polymer which has sufficient high molecular weight to obtain practical molded product cannot be obtained. Recently, it has been found that a ring-opening polymerization of ε-caprolactone produces a higher molecular weight polymer, and proposed to use the polymer as a biodegradable resin. However, the resulting polymer is limited to only special applications because of a low melting point of 62° C. and a high cost thereof. Further, although glycolic acid, lactic acid and the like are polymerized by a ring-opening polymerization of glycolide and lactide thereof to obtain polymers with higher molecular weights so as to be sometimes used as medical fibers and the like, the polymers are not used in great amounts as materials preventing pollution of environment because their decomposition temperatures are close to their melting point and they have defects in their molding properties.

It is no exaggeration to say that high molecular weight polyesters (referring to polyesters having number-average molecular weights of at least 10,000) generally used for foamed film and split materials are limited to polyethylene terephthalete, a condensate of terephthalic acid (including dimethyl terephthalate) and ethylene glycol. Although there are cases of 2,6-naphthalenedicarboxylic acid being used instead of terephthalic acid, there are no reports of trials which obtained polymers with biodegradability.

Therefore, it is safe to say that there has been no concept of trying to make the foamed film and fibrillated materials in practical use by molding using biodegradable aliphatic polyesters in which aliphatic dicarboxylic acid was used.

One of the reasons why this application concept has not been thought of is felt to be that in spite of the required special molding conditions and physical properties for the above foamed film and split materials, most of the above-mentioned aliphatic polyesters have melting points of 100° C. or lower even if they are crystalline, and have poor heat stability when melted above that. Of further importance is that the properties, particularly mechanical properties such as tensile strength, of these aliphatic polyesters show markedly poor values even when they are the same level of number-average molecular weight as the above-mentioned polyethylene terephthalete, so just conceiving that the molded articles having required strength and the like would be obtained was difficult.

Another reason seems to be that studies for improving the physical properties of the aliphatic polyesters by increasing their number-average molecular weights have not been sufficiently advanced because of their poor heat stability.

The object of the present invention is to provide foamed thin materials prepared by using the above-mentioned aliphatic polyesters as their components which have sufficiently high molecular weights for practical use, and excellent mechanical properties represented by heat stability and tensile strength as well as fineness and feel, and which can be decomposed by microorganisms and the like, i.e., are biodegradable as one means of waste disposal so that they may be easily disposed of after the use thereof.

SUMMARY OF THE INVENTION

As a result of various studies of the reaction conditions for obtaining polyesters having sufficient high molecular weight for practical use and molding properties suitable for foamed film and split materials, the present inventors have obtained specific aliphatic polyesters that maintain biodegradability while having sufficient high molecular weights for practical use, then have found that foamed film and split materials prepared from the polyesters have excellent mechanical strength, best sealability, fineness and feel as well as the above-mentioned biodegradability to achieve the present invention.

That is, the present invention provides foamed films and fibrillated materials formed by extruding a composition composed of 100 parts by weight of aliphatic polyester having a melt viscosity of $1.0 \times 10^3 - 1.0 \times 10^5$ poise at a temperature of 190° C. at a shear rate of 100 $sec^{-1}$ and a melting point of 70°–200° C. and 0.2–5 parts by weight of foaming agent.

Furthermore, the present invention provides the above polyester foamed film having an expansion ratio of 1.1–2.2 times, a tensile strength at break (MD) of at least 100 $kg/cm^2$, an elongation at break of at least 100% and a Young's modulus of elasticity of film of at least 1,500 $kg/cm^2$.

DETAILED DESCRIPTION OF THE INVENTION

The present invention will be described below in further detail.

The aliphatic polyester of the present invention mainly consists of a polyester obtained by reacting two components of glycols and dicarboxylic acid (or acid anhydrides thereof), and if necessary as a third component, with at least one polyfunctional component selected from the group consisting of trifunctional or tetrafunctional polyols, oxycarboxylic acids, and polybasic carboxylic acids (or acid anhydrides thereof). The aliphatic polyesters are prepared by reacting relatively high molecular weight polyester prepolymers which have hydroxyl groups at ends with a coupling agent so as to make them even higher molecular weight polymer.

It has been known to obtain polyurethane by reacting a low molecular weight polyester prepolymer having a number-average molecular weight of 2,000–2,500, which have hydroxyl groups as the terminal groups, with diisocyanate as a coupling agent in the preparation of rubbers, foams, coatings and adhesives.

However, the polyester prepolymers used in these polyurethane foams, coatings and adhesives are prepolymers having a low molecular weight and a number-average molecular weight of 2,000–2,500 which is the maximum that can be prepared by non-catalytic reaction. To obtain practical physical properties as the polyurethane, it is necessary that the content of diisocyanate should be as much as 10–20 parts by weight in relation to 100 parts by weight of this low molecular weight prepolymer. When such a large amount of diisocyanate is added to the low molecular weight polyester melted at 150° C. or higher, gelation occurs so that no normal resins which can be molded in the form of a melt can be ontained.

Therefore, polyesters which are obtained by reacting a large amount of diisocyanate with a low molecular weight polyester prepolymers as a raw material cannot be used as the plastic raw material for the foamed film and split materials of the present invention.

Also, as shown in the case of polyurethane rubbers, although a method is conceivable in which hydroxyl groups are converted into isocyanate groups by the addition of diisocyanate, and then the number-average molecular weight thereof is further increased by using glycols, the same problem as mentioned above arises because 10 parts by weight of diisocyanate relative to 100 parts by weight of the prepolymer should be used in order to obtain practical physical properties.

When a relatively high molecular weight polyester prepolymer is to be used, heavy metal catalysts required to prepare the prepolymer would promote the reactivity of the above-mentioned isocyanate groups to undesirably cause poor preservativity, generation of cross-linking and branching; hence a number-average molecular weight of not more than around 2,500 of polyester prepolymers would be the limit if they were to be prepared without catalysts.

The polyester prepolymers to obtain the aliphatic polyesters used in the present invention are relatively high molecular weight saturated aliphatic polyesters having substantially hydroxyl groups at the ends thereof, number-average molecular weights of at least 5,000, preferably at least 10,000, and melting point of 60° C. or higher, which are obtained by reacting glycols and dibasic acids (or acid anhydrides thereof) in the presence of catalysts. When a prepolymer having a number-average molecular weight of lower than 5,000 is used, the small amounts of 0.1–0.5 parts by weight of coupling agents used in the present invention cannot provide polyesters for foamed thin materials having good physical properties. When polyester prepolymers having number-average molecular weights of 5,000 or higher are used, with hydroxyl values of 30 or less, the use of small amounts of coupling agents even under severe conditions such as a molten state and the like can produce high molecular weight polyesters without gelation as the reaction is not affected by remaining catalyst.

Therefore, the polymer for the foamed thin materials of the present invention has a repeated chain structure in which a polyester prepolymer having a number-average molecular weight of 5,000 or more, preferably 10,000 or more and consisting of an aliphatic glycol and aliphatic dicarboxylic acid is combined through the urethane bonds derived from, for example, diisocyanate as a coupling agent.

Further, the polymer for the foamed thin materials of the present invention has a repeated chain structure in which the above-mentioned polyester prepolymer provided with branched long chains derived from polyfunctional components is combined through the urethane bonds derived from, for example, diisocyanate as a coupling agent. When oxazoline, epoxy compounds, and acid anhydrides are used as a coupling agent, the polyester prepolymer has a repeated chain structure through ester bonds.

The polyester foamed film of the present invention exhibits biodegradability when it is buried in the earth, and its broad utilization can be expected in such applications as planting or sowing of plants on wastelands and on slopes by enbedding seeds of various kinds of plants (e.g., lawn) and fungi in cells of the present foamed film as well as in such current applications as for cushion materials and materials requiring good appearance (good looking).

Further, the split materials of the present invention are excellent in fineness and feel and can be used as an absorptive remover of oils split in the sea or filters or various kinds of industrial materials.

Examples of glycols which can be used as a reaction component include aliphatic glycols. Among them those having a straight chain alkylene group with even number carbon atoms of 2, 4, 6, 8 and 10 such as: ethylene glycol, 1,4-butanediol, 1,6-hexanediol, 1,8-octanediol, 1,10-decanediol, and mixtures thereof are preferable.

Of these glycols, those having a smaller number of carbon atoms, such as ethylene glycol, 1,4-butanediol and 1,6-hexanediol, are preferable because they can produce an aliphatic polyester having a high crystallinity and a high melting point. In particular, ethylene glycol and 1,4-butanediol are most suitable because they produce good results.

Examples of aliphatic dicarboxylic acids or anhydrides thereof which provide aliphatic polyester by reacting with glycols include aliphatic dicarboxylic acids. Among them those having a straight chain alkylene group with even number carbon atoms of 2, 4, 6, 8 and 10 such as: succinic acid, adipic acid, suberic acid, sebacic acid, 1,10-decanedicarboxylic acid, succinic anhydride and mixtures thereof are preferable. Of these dicarboxylic acids, those having a smaller number of carbon atoms, such as succinic acid, adipic acid and succinic anhydride, are preferable because they can produce an aliphatic polyester having high crystalinity and high melting points. In particular, succinic acid, succinic anhydride and an acid mixture of succinic acid or succinic anhydride and another dicarboxylic acid such as adipic acid, suberic acid, sebacic acid or 1,10-decanedicarboxylic acid are preferable.

In the system of an acid mixture containing two or more acid components, for example, succinic acid and other dicarboxylic acids, the mixing ratio of succinic acid is at least 70 mol %, preferably at least 90 mol %, and the mixing ratio of the other carboxylic acids is 30 mol % or less, preferably 10 mol % or less.

A combination of 1,4-butanediol and succinic acid or succinic anhydride and a combination of ethylene glycol and succinic acid or succinic anhydride are particularly preferable for the present invention because the combinations exhibit melting points close to that of polyethylene.

Third Component

To these glycols and dicarboxylic acid, if necessary, may be added as a third component at least one polyfunctional component selected from the group consisting of trifunctional or tetrafunctional polyols, oxycarboxylic acid, and polybasic carboxylic acids (or acid anhydrides thereof). The addition of this third component, which causes the branching of long chains, can impart desirable properties in molten state to the polyester prepolymer, because the ratio of weight-average molecular weight (MW)/number-average molecular weight (Mn), i.e., the molecular weight distribution, increases with increases in its molecular weight.

In terms of the amount of polyfunctional components to be added without fear of gelation, a trifunctional component of 0.1–5 mole %, or a tetrafunctional component of 0.1–3 mole % is added relative to 100 mole % of the total of aliphatic dicarboxylic acid (or acid anhydride thereof) components.

Polyfunctional Components

Examples of polyfunctional components as the third component include trifunctional or tetrafunctional polyols, oxycarboxylic acids, and polybasic-carboxylic acids.

The trifunctional polyols representatively include trimethylol propane, glycerin or anhydrides thereof. The tetrafunctional polyols representatively include pentaerythritol.

The trifunctional oxycarboxylic acid components are divided into the two types of (i) a component which has two carboxyl groups and one hydroxyl group in one molecule, and (ii) another component which has one carboxyl group and two hydroxyl groups in one molecule. Malic acid which has two carboxyl groups and one hydroxyl group in one molecule becomes practical and sufficient to the purposes of the present invention in view of commercial availability at low cost.

The tetrafunctional oxycarboxylic acid components are the following three types of components:
  (i) A component which has three carboxyl groups and one hydroxyl group in one molecule;
  (ii) Another component which has two carboxyl groups and two hydroxyl groups in one molecule; and
  (iii) The remaining component which has three hydroxyl groups and one carboxyl group in one molecule. Any type can be used, though in view of commercial availability at low cost, citric acid and tartaric acid are practical and sufficient to the purposes of the present invention.

As a trifunctional polybasic carboxylic acid (or acid anhydride thereof) component trimesic acid, propane tricarboxylic acid and the like can be used. Among them, trimesic anhydride is practical for the purposes of the present invention.

As a tetrafunctional polybasic carboxylic acid (or anhydride thereof) various types of aliphatic compounds, cycloaliphatic compounds, aromatic compounds and the like, described in certain literatures, can be used. In view of commercial availability, for example, pyromellitic anhydride, benzophenone tetracarboxylic anhydride and cyclopentane tetracarboxylic anhydride are practical and sufficient to the purposes of the present invention.

These glycols and dibasic acids are mainly consisted of aliphatic series, while small amounts of other components, for example, aromatic series may be concomitantly used. These other components may be blended in amounts up to 20% by weight, preferably up to 10% by weight, and more preferably up to 5% by weight because blending these compounds degrades biodegradability.

The polyester prepolymer for aliphatic polyesters to be used in the present invention has hydroxyl groups at the terminals. To introduce the hydroxyl groups, it is necessary that glycols are used somewhat excessively.

For preparation of the polyester prepolymer having a relatively high molecular weight, it is necessary to use deglycol-reaction catalysts in the deglycol reaction subsequent to the esterification. Examples of the deglycol-reaction catalysts include titanium compounds such as acetoacetoyl type titanium chelate compounds and organic alkoxy titanium compounds and the like. These titanium compounds can be used in combination. Examples of compounds used in combination include diacetoacetoxy oxytitanium (Nippon Chemical Industry Co., Ltd.; Nursem Titanium) tetraethoxy titanium, tetrapropoxy titanium, tetrabutoxy titanium and the like. The amount of the titanium compound used is 0.001–1 part by weight, and preferably 0.01–0.1 part by weight relative to 100 parts by weight of the polyester prepolymer. These titanium compounds may be blended before the esterification, or may be blended immediately before the deglycol-reaction.

To the polyester prepolymer which has a number-average molecular weight of at least 5,000, preferably at least 10,000, and whose terminal groups are substantially hydroxyl groups are added coupling agents in order to increase its number-average molecular weight.

Examples of the coupling agents include diisocyanate, oxazoline, diepoxy compounds, acid anhydrides and the like. Diisocyanate is particularly preferred.

In the cases of oxazoline and diepoxy compounds, it is necessary that the terminal hydroxyl groups are reacted with acid anhydrides and the like to convert them into carboxyl groups, then coupling agents are used.

Although not limited, examples of diisocyanate include 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate, isophorone diisocyanate and the like. Particularly, hexamethylene diisocyanate is preferably used in terms of hue of prepared resins, reactivity at the time of blending polyesters, and the like.

The adding amounts of these coupling agents are 0.1–5 parts by weight, and preferably 0.5–3 parts by weight relative to 100 parts by weight of polyester prepolymer. Addition of less than 0.1 part by weight causes insufficient coupling reaction, whereas with more than 5 parts by weight gelation tends to occur.

The addition is preferably performed when the polyester is in a uniformly melted state under easily stirrable conditions. Although it is not impossible for the coupling agents to be added to the polyester prepolymer in the solid state and melted and mixed through an extruder, adding the agents in a polyester preparation unit, or adding them to polyester prepolymer in a melt state (for example, in a kneader) is more practical.

The aliphatic polyester to be employed in the present invention has a melt viscosity of $1.0 \times 10^3$–$1.0 \times 10^5$ poises and melting point of 70°–200° C. In the case of the production of the foamed film, a melt viscosity is preferably $2.0 \times 10^3$–$1.0 \times 10^5$ poises, more preferably, $5 \times 10^3$–$5 \times 10^4$ poises. MFR (190° C.) is preferably 20 g/10 min or less. A melt viscosity of lower than 5,000 poises provides films with remarkable instability, resulting in difficulty in molding. With the melt viscosity of higher than 100,000 poise makes the flow through the dies remarkably worse and gives rise to heat generation and uneven running from the die outlet, resulting in poor quality foamed films. MFR (190° C.) of 20 g/10 min or higher results in inferior stability in operation and reduced processablity.

The aliphatic polyester to be used in the present invention is also characterized by having a number-average molecular weight of 20,000 or higher, a melting point of 70°–200° C. and urethane bonds of 0.03–3.0 % by weight. Only those having a number-average molecular weight of 20,000 or higher can give strong cellular films which are applicable to various use. Those having a number-average molecular weight of lower than 20,000 result in a fragile foamed film which is not preferable for films having practical strength.

Further, the aliphatic polyester to be used in the present invention is required to have specific melt properties for extrusion-molding to obtain a foamed fibrillated materials. That is, the aliphatic polyester needs to have a melt viscosity of $1.0 \times 10^3$–$1.0 \times 10^5$ poise, and more preferably $3.0 \times 10^3$–$3.0 \times 10^4$ poise at 190° C. at a shear rate of 100 sec$^{-1}$.

A melt viscosity of lower than $1.0 \times 10^3$ poises provides melt-extruded films with great swing, resulting in instability of molding and insufficient physical properties of the materials. On the other hand, a melt viscosity of higher than $1.0 \times 10^5$ poise makes the melt-extruded materials more difficult to be wound up.

The melt viscosity at a shear rate of 100 sec$^{-1}$ was calculated of 100 sec$^{-1}$ was calculated from a graph which shows the relationship between the apparent viscosities and the shear rates measured by a capillary rheometer using a nozzle having a diameter of 1.0 mm and L/D of 10 at a resin temperature of 190° C.

The melting point of the aliphatic polyester to be used in the present invention needs to be 70°–190° C. preferably 70°–150° C., and more preferably 80°–135° C. A melting point lower than 70° C. will give the foamed thin materials poor heat resistance, whereas with higher than 190° C. it is difficult to carry out forming.

To achieve a melting point higher than 70° C. the polyester prepolymer need to have a melt temperature of at least 60° C.

The aliphatic polyester to be used in the present invention has a number-average molecular weight of 10,000 or higher and content of urethane bonds of 0.03–3.0% by weight, preferably 0.05–2.0% by weight, and more preferably 0.1–1.0% by weight.

The amount of urethane bonds is measured by $^{13}$C NMR, showing good correlation with the charged amount.

Less than 0.03% by weight of urethane has a little effect on polymerization and leads to poor molding properties, whereas more than 3% by weight causes gelation.

The foamed film of the present invention can be molded by an extrusion-molding method in which the resin containing a foaming agent is fully melted and mixed in the extruder, followed by uniform extrusion at a uniform resin temperature to obtain a film of 50–300 μm thick. Particularly, determination of the molding temperature is important. The temperature of the cylinder and the die of the extruder is 130°–240° C., and preferably 150°–200° C. When the temperature is lower than 130° C., a good foamed film can not be obtained. On the other hand, when it is higher than 240° C., the deterioration of the resin and the generation of numerous gum-like substances which is a problem in the molding of the foamed film tend to occur and the cellular state becomes over-foaming, resulting in rough foams. For these reasons, neither of the above conditions are preferable.

Although the method of film molding employed in the present invention may be an ordinary film molding method such as the inflation method, T-die film molding method, and the like, the inflation method may be useful for foaming. For example, by uniformly extruding from the circular die and inflating with an ordinary air cooling-inflation method at a blow-up ratio of about 1.0–3.0, a tubular cellular film with a film about 50–300 μm thick can be obtained.

The physical properties of the thus obtained foamed film generally are a tensile strength at break (MD) of at least 100 kg/cm$^2$, a elongation at break of at least 100%, and a Young's modulus of film of at least 1,500 kg/cm$^2$. When the strength at break is lower than 150 kg/cm$^2$, the film is to weak to be used as a general packaging film. However, it has beautiful pearly appearance because of it being cellular film and excellent insulating properties. Such film can be used as a material for shopping bags or wrapping containers which need impact strength or insulating properties by making it thicker to increase its strength.

It is a characteristic of the present foamed film that its elongation at break is 100% or higher. Therefore, the film of the present invention has a characteristic property that it can protect contents against projections or various kinds of impacts without damaging the contents as a packaging material, due to such extension at break property as well as its cushioning property. The film of the present invention also has a Young's modulus of elasticity of 1,500 kg/cm$^2$ or higher and, consequently, can be subjected to secondary processes for automatic packaging, bag making, and the like, by making the film thick (50 μm or more).

In order to produce the foamed fibrillated materials of the present invention, the raw material mainly comprising an aliphatic polyester used in the present invention is generally split by melt-extruding from the split nozzle and then air cooling and taking up to fibrillate. The molding temperature is 170°–240° C., and preferably 180°–190° C. A molding temperature of lower than 170° C. provides the films which are not fibrillated yet with a tendency to break, and a molding temperature of higher than 240° C. gives the melt films a great swing as well as gives the resulting cellular fibrillated material a tendency to cut.

The foaming agent should be vaporized or decomposed to generate a gas at the molding temperature or lower, and therefore a solid foaming agent having a decomposition temperature of 165°–200° C. is preferably used. When the amount of the foaming agent is less than 0.2 part by weight relative to the aliphatic polyester used in the present invention, the foaming volume becomes small and the fibrillating degree becomes low. On the other hand, when it is more than 5 parts by weight relative to the aliphatic polyester, the foam becomes rough and non-uniform and the split level of fibrillization becomes rough and non-uniform as well. For these reasons, in neither of the above conditions can a low denier cellular fibrillated material be obtained.

It is needless to say that when the above-mentioned aliphatic polyester is used to obtain the foamed thin materials according to the present invention, if necessary, lubricants, waxes, coloring agents and crystallizing promoters as well as antioxidants, thermal stabilizers, UV absorbents and the like can be used concomitantly.

That is, antioxidants include hindered phenol antioxidants such as p-tert-butyl hydroxytoluene and p-tert-butyl hydroxyanisole, sulfur antioxidants such as distearyl thiodipropionate and dilauryl thiodipropionate, and the like; heat stabilizers include triphenyl phosphite, trilauryl phosphite, trisnonylphenyl phosphite and the like; UV absorbers include p-tert-butyl phenyl salicylate, 2-hydroxy-4-methoxybenzophenone, 2-hydroxy-4-methoxy-2'-carboxybenzophenone, 2,4,5-trihydroxybutylophenone and the like; lubricants include calcium stearate, zinc stearate, barium stearate, sodium palmitate and the like; antistatic agents include N,N-bis(hydroxyethyl)alkyl amine, alkyl amine, alkyl allyl sulfonate, alkyl sulfonate and the like; flame retarders include hexabromocyclododecane, tris-(2,3-dichloropropyl) phosphate, pentabromophenyl allyl ether and the like; inorganic fillers include calcium carbonate, silica, titanium oxide, talc, mica, barium sulfate, alumina and the like; crystallizing promoters include polyethylene terephthalate, poly-trans-cyclohexane dimethanol terephthalate and the like.

EXAMPLES

The present invention will be illustrated with reference to the following Examples and Comparative Examples, but the invention is not intended to be limited only thereto.

Example 1

A 700 L reactor was purged with nitrogen, then 183 kg of 1,4-butanediol and 224 kg of succinic acid were charged in it. After the temperature was elevated under nitrogen stream, esterification by dehydration condensation was carried out for 3.5 hr at 192°–220° C., and after ceasing nitrogen charge, for further 3.5 hr under reduced pressures of 20–2 mmHg. A sample collected had an acid value of 9.2 mg/g, a number-average molecular weight (Mn) of 5,160 and a weight average molecular weight (Mw) of 10,670. Subsequently, 34 g of tetraisopropoxy titanium, a catalyst, was added at normal pressures under nitrogen stream. The temperature was elevated to carry out a deglycol-reaction at temperatures of 215°–220° C. under reduced pressures of 15–0.2 mmHg for 5.5 hr. A sample collected had a number-average molecular weight (Mn) of 16,800 and a weight average molecular weight (Mw) of 43,600. The yield of resulting polyester prepolymer (A1) was 339 kg except condensate water.

5.42 kg of hexamethylene diisocyanate was added to the reactor containing 339 kg of the polyester prepolymer (A1) to perform a coupling reaction for 1 hr at 180°–200° C. The viscosity was rapidly increased, but no gelation occurred. Then, 1.70 kg of Irganox 1010 (Ciba-geigy) as an antioxidant and 1.70 kg of calcium stearate as a lubricant were added, and the mixture was further stirred for 30 min. The resulting reaction product was extruded into water, and cut by a cutter into pellets. The aliphatic polyester (B1) obtained after drying in a vacuum at 90° C. for 6 hr had a yield of 300 kg.

The obtained polyester (B1) was a slightly ivorylike white, waxy crystal, and had a melting point of 110° C., a number-average molecular weight (Mn) of 35,500 a weight-average molecular weight (Mw) of 170,000, a MFR (190° C.) of 1.0 g/10 min, a viscosity of 230 poises in a 10% orthochlorophenol solution and a melt viscosity of $1.5 \times 10^4$ poises at a temperature of 190° C. at a shear rate of 100 sec$^{-1}$. The average-molecular weight was measured by a Shodex GPC System-11 (Showa Denko, gel permiation chromatography) using a HFIPA solution containing 5 mmol $CF_3COONa$ (concentration of 0.1% by weight) as a medium. A calibration curve was drawn using a PMMA standard sample (Shodex Standard M-75, Showa Denko).

Next, a dry-blended mixture of 100 parts by weight of polyester resin (B1) and 3 parts by weight of azodicarbonamide as a foaming agent was extruded by using of the extruder having a screw diameter of 40 mmΦ and L/D=28 at a resin temperature of 185° C. (at the cylinder and the die) from the 50 mmΦ of spiral die (0.5 mm of lip gap), and then cooled by air from an air ring by a normal air-cooling inflation method at a take up speed of 10 m/min to obtain a tubular cellular film having a lay-flat width of 200 mm (blow up ratio of 2.55) and a 120 μm of thickness. The film molding could be proceeded stably by adjustment of the air volume from the blower and the air ring to control the cooling condition.

The obtained film showed a tensile strength at break (JIS Z-1702, the same being applied to the following) of 120 kg/cm$^2$, a tensile elongation (JIS Z-1702, the same being applied to the following.) was 150%, Young's modulus of elasticity (ASTM D-822, the same being applied to the following) of 2200 kg/cm$^2$ and a foam expansion ratio of 2.0 times, and had pearly fine cells and had excellent touch and aesthetic properties. The film could be heat-sealed by a heat sealer consisting of heating plates and the seal strength was 1.2 kg/15 mm-width at 120° C. for 1 sec. and at 1 kg/cm$^2$ of pressure.

Further, buried in the earth for two months, the strength of the film decreased remarkably, i.e., the tensile strength at break and the elongation at break were 30 kg/cm$^2$ and 50%, respectively, and it was clear that the film had decomposed in the earth.

Example 2

A dry-blended mixture of 100 parts by weight of polyester resin (B1) used in Example 1 and 3 parts by weight of azodicarbonamide as a foaming agent was extruded by using the extruder having a screw diameter of 40 mmΦ and L/D=28 at a resin temperature of 170° C. (at the cylinder and the die) from a 50 mmΦ spiral die (0.5 mm of lip gap), and then cooled by air from the air ring while taking up at a speed of 6 m/min by the ordinary air-cooling inflation method to obtain a tubular cellular film having a lay-flat width of 200 mm (blowup ratio of 2.55) and a 200 μm of thickness. The film molding could be proceeded stably by adjustment of the air volume from the blower and the air ring to control the cooling condition.

The obtained film showed tensile strength at break of 150 kg/cm$^2$, a tensile elongation of 180%, a Young's modulus of 2000 kg/cm$^2$ and an expansion ratio of 1.8 times, and it had a pearly appearance and fine cells and was excellent in touch and aesthetic property. The film could be heat-sealed by a heat sealer consisting of heating plates and the seal strength was 1200 g/15 mm-width at 120° C. for 1 sec. and 1 kg/cm$^2$ of pressure.

Example 3

A 700 L reactor was purged with nitrogen, then 177 kg of 1,4-butanediol, 198 kg of succinic acid and 25 kg of adipic acid were charged in it. After the temperature was elevated under nitrogen stream, esterification by dehydration condensation was performed for 3.5 hr at 190°–210° C., and after ceasing nitrogen charge, for further 3.5 hr under reduced pressures of 20-2 mmHg. A sample collected had an acid value of 9.6 mg/g, a number-average molecular weight (Mn) of 6,100 and weight-average molecular weight (Mw) of 12,200. Subsequently, 20 g of tetraisopropoxy titanium, a catalyst, was added at normal pressures under nitrogen stream. The temperature was elevated to perform a deglycol-reaction at temperatures of 210–220° C. under reduced pressures of 15–0.2 mmHg for 6.5 hr. A sample collected had a number-average molecular weight (Mn) of 17,300 and a weight-average molecular weight (Mw) of 46,400. The resulting polyester (A2) had a yield of 337 kg except condensate water.

4.66 kg of hexamethylene diisocyanate was added to the reactor containing 337 kg of polyester (A2) to perform a coupling reaction for 1 hr at 180°–200° C. The viscosity was rapidly increased, but no gelation occurred. Then, 1.70 kg of Irganox 1010 (Ciba-Geigy) as an antioxidant and 1.70 kg of calcium stearate as a lubricant were added, and the mixture was further stirred for 30 min. The resulting reaction product was extruded into water by an extruder, and cut by a cutter into pellets. The aliphatic polyester (B2) obtained after drying in a vacuum at 90° C. for 6 hr had a yield of 300 kg.

The obtained polyester (B2) was a slightly ivory-like white, waxy crystal, and had a melting point of 103° C., a number-average molecular weight (Mn) of 36,000, a weight-average molecular weight (Mw) of 200,900, a MFR (190° C.) of 0.52 g/10 min, a viscosity of 680 poises in a 10% orthochlorophenol solution and a melt viscosity of $2.2 \times 10^4$ poises at a temperature of 190° C. at a shear rate of 100 sec$^{-1}$.

A dry-blended mixture of 100 parts by weight of polyester resin (B2) and 0.7 parts by weight of azodicarbonamide as a foaming agent was extruded by using of the extruder having a screw diameter of 40 mmΦ and L/D=28 at a resin temperature of 180° C. (at the cylinder and the die) from a 50 mmΦ spiral die (0.5 mm of lip gap), and then cooled by air from the air ring while taking up at a speed of 10 m/min by the ordinary air-cooling inflation method to obtain a tubular cellular film having a lay-flat width of 160 mm (blow up ratio of 2.0) and a 100 μm of thickness. The film molding could be proceeded stably by adjustment of the air volume from the blower and the air ring for control the cooling condition.

The obtained film showed tensile strength at break of 160 kg/cm$^2$, a tensile elongation of 180%, a Young's modulus of 2400 kg/cm$^2$ and an expansion ratio of 1.7 times, and it had a pearly appearance and fine cells and was excellent in touch and aesthetic property. The film could be heat-sealed by a heat sealer consisting of heating plates and the seal strength was 1100 g/15 mm-width at 115° C. for 1 sec. and 1 kg/cm$^2$ of pressure.

Further, buried in the earth for three months, the strength of the film decreased remarkably, i.e., the strength at break and the elongation at break were 60 kg/cm$^2$ and 50%, respectively, and it was clear that the film had decomposed in the earth.

Example 4

A 700 L reactor was purged with nitrogen, then 145 kg of ethylene glycol, 251 kg of succinic acid and 4.1 kg of citric acid were charged in it. After the temperature was elevated under nitrogen stream, esterification by dehydration condensation was performed for 3.5 hr at 190°–210° C., and after ceasing nitrogen charge, for further 5.5 hr under reduced pressures of 20-2 mmHg. A sample collected had an acid value of 8.8 mg/g, a number-average molecular weight (Mn) of 6,800 and a weight-average molecular weight (Mw) of 13,500. Subsequently, 20 g of tetraisopropoxy titanium, a catalyst, was added at normal pressures under nitrogen stream. The temperature was elevated to perform a deglycol-reaction at temperatures of 210°–220° C. under reduced pressures of 15–0.2 mmHg for 4.5 hr. A sample collected had a number-average molecular weight (Mn) of 33,400 and a weight-average molecular weight (Mw) of 137,000. The resulting polyester (A3) had a yield of 323 kg except condensate water.

3.23 kg of hexamethylene diisocyanate was added to the reactor containing 323 kg of polyester (A3) to perform a coupling reaction for 1 hr at 180°–200° C. The viscosity was rapidly increased, but no gelation occurred. Then, 1.62 kg of Irganox 1010 (Ciba-Geigy) as an antioxidant and 1.62 kg of calcium stearate as a lubricant were added, and the mixture was further to stirred for 30 min. The resulting reaction product was extruded into water by an extruder, and cut by a cutter into pellets. The polyester (B3) obtained after drying in a vacuum at 90° C. for 6 hr had a yield of 300 kg.

The obtained polyester (B3) was a slightly ivory-like white, waxy crystal, and had a melting point of 96° C., a number-average molecular weight (Mn) of 54,000, a weight-average molecular weight (Mw) of 324,000, a MFR (190° C.) of 1.1 g/10 min, a viscosity of 96 poises in a 10% orthochlorophenol solution and a melt viscosity of $1.6 \times 10^4$ poises at a temperature of 190° C. at a shear rate of 100 sec$^{-1}$.

A dry-blended mixture of 100 parts by weight of polyester resin (B3) and 1 parts by weight of azodicarbonamide as a foaming agent was extruded by using of the extruder having a screw diameter of 55 mmΦ and L/D=28 at a resin temperature of 190° C. (at the cylinder and the die) from a 100 mmΦ spiral die (0.5 mm of lip gap), and then cooled by air from the air ring while taking up at a speed of 10 m/min by the ordinary air-cooling inflation method to obtain a tubular cellular film having a lay-flat width of 314 mm (blow up ratio of 2.0) and a 200 μm of thickness. The film molding could be proceeded stably by adjustment of the air volume from the blower and the air ring for control the cooling condition.

The obtained film showed tensile strength at break of 150 kg/cm$^2$, a tensile elongation of 180%, a Young's modulus of 2300 kg/cm$^2$ and an expansion ratio of 1.8 times, and it had a pearly appearance and fine cells and was excellent in touch and aesthetic property. The film could be heat-sealed by a heat sealer consisting of heating plates and the seal strength was 2300 g/15 mm-width at 115° C. for 1 sec. and 1 kg/cm$^2$ of pressure.

Example 5

A 700 L reactor was purged with nitrogen, then 200 kg of 1,4-butanediol, 250 kg of succinic acid and 2.8 kg of trimethylol propane were charged in it. After the temperature was elevated under nitrogen stream, esterification by dehydration condensation was performed for 4.5 hr at 192°–220° C., and after ceasing nitrogen charge, for further 5.5 hr under reduced pressures of 20–2 mmHg. A sample collected had an acid value of 10.4 mg/g, a number-average molecular weight (Mn) of 4,900 and a weight average molecular weight (Mw) of 10,000. Subsequently, 37 g of tetraisopropoxy titanium, a catalyst, was added at normal pressures under nitrogen stream. The temperature was elevated to perform a deglycol-reaction at temperatures of 210°–220° C. under reduced pressures of 15–1.0 mmHg for 8 hr. A sample collected had a number-average molecular weight (Mn) of 16,900 and a weight-average molecular weight (Mw) of 90,300. The resulting polyester (A4) had a yield of 367 kg except condensate water of 76 kg.

3.67 kg of hexamethylene diisocyanate was added to the reactor containing 367 kg of polyester (A4) to perform a coupling reaction for 1 hr at 160°–200° C. The viscosity was rapidly increased, but no gelation occurred. Then, 367 g of Irganox 1010 (Ciba-Geigy) as an antioxidant and 367 g of calcium stearate as a lubricant were added, and the mixture was further stirred for 30 min. The resulting reaction product was extruded into water by an extruder, and cut by a cutter into pellets. The polyester (B4) obtained after drying in a vacuum at 90° C. for 6 hr had a yield of 350 kg.

The obtained polyester (B4) was a slightly ivorylike white, waxy crystal, and had a melting point of 110° C., a number-average molecular weight (Mn) of 17,900 a weight-average molecular weight (Mw) of 161,500 (Mw/Mn=9.0), a MFR (190° C.) of 0.21 g/10 min and a melt viscosity of $2.0 \times 10^4$ poises at a temperature of 190° C. at a shear rate of 100 sec$^{-1}$.

The polyester resin (B4) was extruded by using of the extruder having a screw diameter of 55 mmΦ and L/D=28 at a resin temperature of 190° C. (at the cylinder and the die) from a 100 mmΦ spiral die (0.8 mm of lip gap), and then cooled by air from the air ring while taking up at a speed of 10 m/min by the ordinary air-cooling inflation method to obtain a tubular cellular film having a lay-flat width of 314 mm (blow up ratio of 2.0) and a 250 μm of thickness. The film molding could be proceeded stably by adjustment of the air volume from the blower and the air ring for control the cooling condition.

The obtained film showed tensile strength at break of 180 kg/cm$^2$, a tensile elongation of 200%, a Young's modulus of 2500 kg/cm$^2$ and an expansion ratio of 1.9 times, and it had a pearly appearance and fine cells and was excellent in touch and aesthetic property. The film could be heat-sealed by a heat sealer consisting of heating plates and the seal strength was 2000 g/15 mm-width at 115° C. for 1 sec. and 1 kg/cm$^2$ of pressure.

Further, buried in the earth for two months, the strength of the film decreased remarkably, i.e., the breaking strength and the elongation at break were 20 kg/cm$^2$ and 40%, respectively, and it was clear that the film had decomposed in the earth.

Example 6

The composition of 50% by weight of polyester (B1) used in Example 1 and 50% by weight of polyester (B4) used in Example 5 was extruded by using of the extruder having a screw diameter of 40 mmΦ and L/D=28 at a resin temperature of 200° C. (at the cylinder and the die) from a 50 mmΦ spiral die (0.8 mm of lip gap), and then cooled by air from the air ring while taking up at a speed of 5 m/min by the ordinary air-cooling inflation method to obtain a tubular cellular film having a lay-flat width of 200 mm (blow-up ratio of 2.55) and a 180 μm of thickness. The film molding could be proceeded stably by adjustment of the air volume from the blower and the air ring for control the cooling condition.

The obtained film showed tensile strength at break of 200 kg/cm$^2$, a tensile elongation of 230% and a Young's modulus of 2800 kg/cm$^2$. The film could be heat-sealed by a heat sealer consisting of heating plates and the seal strength was 1300 g/15 mm-width at 120° C. for 1 sec. and 1 kg/cm$^2$ of pressure.

Further, buried in the earth for two months, the strength of the film decreased remarkably, i.e., the strength was 1300 g/15 mm-width at 120° C. for 1 sec. and 1 kg/cm$^2$ of pressure.

Further, buried in the earth for two months, the strength of the film decreased remarkably, i.e., the strength at break and the elongation at break were 50 kg/cm$^2$ and 60%, respectively, and it was clear that the film had decomposed in the earth.

Comparative Example 1

A dry-blended mixture of 100 parts by weight of polyester resin (B1) used in Example 1 and 3 parts by weight of azodicarbonamide as a foaming agent was extruded by using of an extruder having a screw diameter of 40 mmΦ and L/D=28 at a resin temperature of 250° C. (at the cylinder and the die) from a 50 mmΦ spiral die (0.5 mm of lip gap), and cooling by the ordinary air-cooling inflation method while being taken. However, the bubble was deformed and became unstable, and a uniform cellular film could not be molded.

Comparative Example 2

A dry-blended mixture of 100 parts by weight of polyester resin (B1) used in Example 1 and 3 parts by weight of azodicarbonamide as a foaming agent extruded by using an extruder having a screw diameter of 40 mmΦ and L/D=28 at a resin temperature of 118° C. (at the cylinder and the die) from a 50 mmΦ of spiral die (0.5 mm of lip gap), and then cooling up by an ordinary air-cooling inflation method while being taken. However, the viscosity of the melting resin discharged from the the die outlet was too high and the resin was broken without extension, and therefore, a film could not be molded.

Example 7

100 Parts by weight of polyester (B1) obtained by Example 1 was dry-blended with 0.8 part by weight of azodicarbonamide as a foaming agent, followed by melt-extruding by using a 55 mmΦ extruder at a slit space of 0.5 mm from a circular die of 200 mmΦ at a molding temperature of 230° C. Just after the melt-extrusion, the resultant extrusion was subjected to air cooling by blowing normal temperature air from the air ring until it reached a position backward of the fibrillation starting point (a position of 2 cm from the circular die), while being taken up at a speed of 150 m/min to obtain a fibrillated material.

The obtained cellular fibrillated material had the form of a net with little snapping and showed a fineness of 36,000 denier as a whole and 5–20 denier for net fragments. The cellular fibrillated material showed uniform and fine fibrillation level and its touch and aesthetic properties were excellent.

When the fibrillated material was buried in the earth for five months, it decomposed to a state with no practical tensile strength.

Example 8

100 Parts by weight of polyester (B1) obtained by Example 1 was dry-blended with 0.8 part by weight of azodicarbonamide as a foaming agent, followed by melt-extruding by using a 55 mmΦ extruder from a circular die of 200 mmΦ lip gap of 0.5 mm), at a molding temperature of 170° C. Just after the melt-extrusion, the resultant extrusion was subjected to air cooling by blowing normal temperature air from the air ring until it reached a position backward of the fibrillation starting point (a position of 2 cm from the circular die), while being taken up at a speed of 150 m/min to obtain a fibrillated material.

The obtained fibrillated material had the form of a net with little snapping and showed a strength of 36,000 denier as a whole and 5–20 denier for net fragments. The cellular fibrillated material showed uniform and fine fibrillation level and its touch and aesthetic properties were excellent.

When the cellular fibrillated material was buried in the earth for five months, it decomposed to a state with no practical tensile strength.

Example 9

100 Parts by weight of polyester (B1) obtained by Example 1 was dry-blended with 3.0 part by weight of azodicarbonamide as a foaming agent, followed by melt-extruding by using a 55 mmΦ extruder from a circular die of 200 mmΦ (0.5 mm of lip gap) at a molding temperature of 170° C. Just after the melt-extrusion, the resultant extrusion was subjected to air cooling by blowing normal temperature air from the air ring until it reached a position backward of the fibrillation starting point (a position of 2 cm from a circular die), while being taken up at a speed of 150 m/min to obtain a fibrillated material.

The obtained fibrillated material had the form of a net with little snapping and showed a fineness of 36,000 denier as a whole and 5–20 denier for net fragments. The cellular fibrillated material showed uniform and fine fibrillation level and its touch and aesthetic properties were excellent.

When the cellular fibrillated material was buried in the earth for five months, it decomposed to a state with no practical tensile strength.

Example 10

100 Parts by weight of polyester (B2) obtained by Example 2 was dry-blended with 0.8 part by weight of azodicarbonamide as a foaming agent, followed by melt-extruding by using a 55 mmΦ extruder from a circular die of 200 mmΦ at a molding temperature of 230° C. Just after the melt-extrusion, the resultant extrusion was subjected to air cooling by blowing normal temperature air from the air ring until it reached a position backward of the fibrillating starting point (a position of 2 cm from the circular die), while being taken up at a speed of 150 m/min to obtain a fibrillated material.

The obtained fibrillated material had the form of a net with little snapping and showed a fineness of 36,000 denier as a whole and 5–20 denier for net fragments. The cellular fibrillated material showed uniform and fine fibrillation level and its touch and aesthetic properties were excellent.

When the cellular fibrillated material was buried in the earth for five months, it decomposed to a state with no practical tensile strength.

Example 11

100 Parts by weight of polyester (B2) obtained by Example 2 was dry-blended with 0.8 part by weight of azodicarbonamide as a foaming agent, followed by melt-extruding by using a 55 mmΦ extruder from a circular die of 200 mmΦ (0.5 mm of lip gap), at a molding temperature of 170° C. Just after the melt-extrusion, the resultant extrusion was subjected to air cooling by blowing normal temperature air from the air ring until it reached a position backward of the fibrillations starting point (a position of 2 cm from the circular die), while being taken up at a speed of 150 m/min to obtain a split material.

The obtained fibrillated material had the form of a net with little snapping and showed a fineness of 36,000 denier as a whole and 5–20 denier for net fragments. The cellular fibrillated material showed uniform and fine fibrillation level and its touch and aesthetic properties were excellent.

When the cellular fibrillated material was buried in the earth for five months, it decomposed to a state with no practical tensile strength.

Example 12

100 Parts by weight of polyester (B3) obtained by Example 4 was dry-blended with 0.8 part by weight of azodicarbonamide as a foaming agent, followed by melt-extruding by using a 55 mmΦ extruder from a circular die of 200 mmΦ (0.5 mm of lip gap), at a molding temperature of 230° C. Just after the melt-extrusion, the resultant extrusion was subjected to air cooling by blowing normal temperature air from the air ring until it reached a position backward of the fibrillation starting point (a position of 2 cm from the circular die), while being taken up at a speed of 150 m/min to obtain a fibrillated material.

The obtained fibrillated material had the form of a net with little snapping and showed a fineness of 36,000 denier as a whole and 5–20 denier for net fragments. The cellular fibrillated material showed uniform and fine fibrillation level and its touch and aesthetic properties were excellent.

When the cellular fibrillated material was buried in the earth for five months, it decomposed to a state with no practical tensile strength.

Example 13

100 Parts by weight of polyester (B4) obtained by Example 5 was dry-blended with 0.8 part by weight of azodicarbonamide as a foaming agent, followed by melt-extruding by using a 55 mmΦ extruder from a circular from a circular die of 200 mmΦ, (0.5 mm of lip gap), at a molding temperature of 230° C. Just after the melt-extrusion, the resultant extrusion was subjected to air cooling by blowing normal temperature air from the air ring until it reached a position backward of the fibrillation starting point (a position of 2 cm from the slit nozzle), while being taken up at a speed of 150 m/min to obtain a fibrillated material.

The obtained split material had the form of a net with little snapping and showed a fineness of 36,000 denier as a whole and 5-20 denier for net fragments. The cellular fibrillated material showed uniform and fine fibrillation level and its touch and aesthetic properties were excellent.

When the cellular fibrillated material was buried in the earth for five months, it decomposed to a state with no practical tensile strength.

Comparative Example 3

100 Parts by weight of polyester (A1) obtained by Example 1 was dry-blended with 0.8 part by weight of azodicarbonamide as a foaming agent, followed by melt-extruding by using a 55 mmΦ extruder from a circular die 200 mmΦ (0.5 mm of lip gap) at a molding temperature of 230° C. Just after the melt-extrusion, the resultant extrusion was subjected to an air cooling by blowing normal temperature air from the air ring until it reached a position backward of the fibrillation starting point (a position of 2 cm from the slit nozzle), while being taken up by gradually elevating the take up speed at a 2 m/min interval to obtain a cellular fibrillated material of 36,000 deniers as a whole. In this process, in order to obtain such cellular fibrillated material, the extruding volume was also varied. However, when the take up speed reached 14 m/min, snapping occurred in many places and the net fragment was 20-100 deniers. The cellular fibrillated material showed a non-uniform and rough fibrillization level and its touch and aesthetic properties were not good.

This cellular fibrillated material showed the same level of biodegradability as that of Example 1.

What is claimed is:

1. An aliphatic polyester cellular fibrillated material which has a form of a net comprising net fragments of 5-20 denier;
   wherein said aliphatic polyester has a melt viscosity of $1.0 \times 10^3$–$1.0 \times 10^5$ poises at a temperature of 190° C. and a shear rate of 100 sec$^{-1}$, and has a melting point of 70°–200° C.; and
   wherein said aliphatic polyester is obtained by reacting a diisocyanate with an aliphatic polyester prepolymer having a number average-molecular weight of at least 5,000 and a melting point of at least 60° C.

2. An aliphatic polyester cellular fibrillated material as claimed in claim 1, wherein the polyester has a melt viscosity of $2.0 \times 10^3$–$1.0 \times 10^5$ poises at a temperature of 190° C. and a shear rate of 100 sec$^{-1}$, number-average molecular weight of 20,000 or higher, and MFR (190° C.) of 20 g/10 min or lower.

3. An aliphatic polyester cellular fibrillated material as claimed in claim 1, wherein the aliphatic polyester contains 0.03-3.0% by weight of urethane bonds.

4. An aliphatic polyester cellular fibrillated material as claimed in claim 3, wherein the aliphatic polyester has a repeated chain structure in which a polyester prepolymer having a number-average molecular weight (Mn) of 5,000 or more and consisting of an aliphatic glycol and aliphatic dicarboxylic acid, is bonded through the urethane bonds.

5. An aliphatic polyester cellular fibrillated material as claimed in claim 3, wherein the aliphatic polyester has a repeated chain structure in which a polyester prepolymer having a number-average molecular weight (Mn) of 5,000 or more and obtained by reacting an aliphatic glycol, aliphatic dicarboxylic acid and, as a third component, at least one polyfunctional component selected from the group consisting of trifunctional or tetrafunctional polyols, oxycarboxylic acids and polybasic carboxylic acids or acid anhydrides thereof, is bonded through a urethane bond.

6. An aliphatic polyester cellular fibrillated material as claimed in claim 3, wherein the polyester prepolymer has a unit selected from the group consisting of ethylene glycol, 1,4-butanediol, 1,6-hexanediol, decamethylene glycol, neopentyl glycol and 1,4-cyclohexane dimethanol as a glycol unit, and has a unit selected from the group consisting of succinic acid, adipic acid, suberic acid, sebasic acid, dodecanoic acid, succinic anhydride and adipic anhydride as a dicarboxylic acid unit.

7. An aliphatic polyester cellular fibrillated material as claimed in claim 5, wherein the polyester prepolymer contains one or more compounds selected from the group consisting of trimethylol propane, glycerin and pentaerythritol as the trifunctional or tetrafunctional polyol of the third component.

8. An aliphatic polyester cellular fibrillated material as claimed in claim 18, wherein the polyester prepolymer contains one or more compounds selected from the group consisting of malic acid, citric acid and tartaric acid as the trifunctional or tetrafunctional oxycarboxylic acid of the third component.

9. An aliphatic polyester cellular fibrillated material as claimed in claim 5, wherein the polyester prepolymer contains one or more compounds selected from the group consisting of trimesic acid, propane tricarboxylic acid, trimellitic anhydride, pyromellitic anhydride, benzophenone tetracarboxylic anhydride and cyclopentane tetracarboxylic anhydride as the trifunctional or tetrafunctional polybasic carboxylic acid of the third component.

10. An aliphatic polyester cellular fibrillated material as claimed in claim 2, wherein the aliphatic polyester contains 0.03-3.0% by weight of urethane bonds.

11. An aliphatic polyester cellular fibrillated material as claimed in claim 10, wherein the aliphatic polyester has a repeated chain structure in which a polyester prepolymer having a number-average molecular weight (Mn) of 5,000 or more and consisting of an aliphatic glycol and aliphatic dicarboxylic acid, is bonded through the urethane bonds.

12. An aliphatic polyester cellular fibrillated material as claimed in claim 10, wherein the aliphatic polyester has a repeated chain structure in which a polyester prepolymer having a number-average molecular weight (Mn) of 5,000 or more and obtained by reacting an aliphatic glycol, aliphatic dicarboxylic acid and, as a third component, at least one polyfunctional component selected from the group consisting of trifunctional or tetrafunctional polyols, oxycarboxylic acids and polybasic carboxylic acids or acid anhydrides thereof, is bonded through a urethane bond.

13. An aliphatic polyester cellular fibrillated material as claimed in claim 10, wherein the polyester prepolymer has a unit selected from the group consisting of ethylene glycol, 1,4-butanediol, 1,6-hexanediol, decamethylene glycol, neopentyl glycol and 1,4-cyclohexane dimethanol as a glycol unit, and has a unit selected from the group consisting of succinic acid, adipic acid, suberic acid, sebasic acid, dodecanoic acid, succinic anhydride and adipic anhydride as a dicarboxylic acid unit.

14. An aliphatic polyester cellular fibrillated material as claimed in claim 12, wherein the polyester prepolymer contains one or more compounds selected from the group consisting of trimethylol propane, glycerin and pentaerythritol as the trifunctional or tetrafunctional polyol of the third component.

15. An aliphatic polyester cellular fibrillated material as claimed in claim 12, wherein the polyester prepolymer contains one or more compounds selected from the group consisting of malic acid, citric acid and tartaric acid as the trifunctional or tetrafunctional oxycarboxylic acid of the third component.

16. An aliphatic polyester cellular fibrillated material as claimed in claim 12, wherein the polyester prepolymer contains one or more compounds selected from the group consisting of trimesic acid, propane tricarboxylic acid, trimellitic anhydride, pyromellitic anhydride, benzophenone tetracarboxylic anhydride and cyclopentane tetracarboxylic anhydride as the trifunctional or tetrafunctional polybasic carboxylic acid of the third component.

* * * * *